(12) United States Patent
Okanoue et al.

(10) Patent No.: US 6,961,321 B1
(45) Date of Patent: Nov. 1, 2005

(54) MOBILE TERMINAL AND METHOD OF CONTROLLING THE SAME

(75) Inventors: Kazuhiro Okanoue, Tokyo (JP); Tomoki Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/576,920

(22) Filed: May 23, 2000

Related U.S. Application Data

(62) Division of application No. 09/129,527, filed on Aug. 5, 1998.

(30) Foreign Application Priority Data

Aug. 5, 1997 (JP) .................................. 9-210995

(51) Int. Cl.[7] ............................................ H04Q 7/00
(52) U.S. Cl. ...................................... 370/313; 370/465
(58) Field of Search .............................. 370/313, 315, 370/338, 389, 400, 401, 465

(56) References Cited

U.S. PATENT DOCUMENTS

| | | | | |
|---|---|---|---|---|
| 5,276,680 A | * | 1/1994 | Messenger | 370/311 |
| 5,412,654 A | * | 5/1995 | Perkins | 370/312 |
| 5,652,751 A | * | 7/1997 | Sharony | 370/227 |
| 5,721,733 A | | 2/1998 | Wang et al. | |
| 5,729,680 A | * | 3/1998 | Belanger et al. | 709/222 |
| 5,751,693 A | | 5/1998 | Dinkins | |
| 5,896,377 A | | 4/1999 | Boot et al. | |
| 5,918,016 A | * | 6/1999 | Brewer et al. | 709/220 |

FOREIGN PATENT DOCUMENTS

| | | |
|---|---|---|
| JP | 7-303105 | 11/1995 |
| JP | 7-336370 | 12/1995 |
| JP | 8-242246 | 9/1996 |
| JP | 9-130391 | 5/1997 |
| JP | 9-186690 | 7/1997 |

OTHER PUBLICATIONS

"Internetworking with TCP/IP vol. I Principles, Protocols and Architecture", Third edition, 1995, Prentice-Hall, Inc., by Douglas Comer.
The Convention of the Society for Electronics, Information and Communication, 1997, B-7-135, Aug. 13, 1997.
The Convention of the Society for Electronics, Information and Communication, 1995, B-469 Aug. 15, 1995.

* cited by examiner

*Primary Examiner*—Huy D. Vu
*Assistant Examiner*—Daniel Ryman
(74) *Attorney, Agent, or Firm*—Scully Scott Murphy & Presser

(57) ABSTRACT

A mobile terminal and method of controlling the same, each that can integrally move between an infrastructure network and an ad hoc network. The mobile terminal can interconnect an infrastructure network and an ad hoc network while moving. In an address management process, a connection network identification process, and a destination address capture process which are needed to establish communications with the terminal connected to a network, an infrastructure network connection procedure is integrated with an ad hoc network connection procedure. The integrated configuration consists of an ad hoc/infrastructure network address management means, an ad hoc/infrastructure integration move management means, an ad hoc/infrastructure network integration destination address capture means. In each process, it is identified whether or not the mobile terminal is connected to an ad hoc network or infrastructure network, so that the procedure corresponding to the connected network is used.

11 Claims, 6 Drawing Sheets

MOBILE TERMINAL AND METHOD OF CONTROLLING THE SAME

CROSS REFERENCE TO RELATED APPLICATION

The present application is a divisional of application Ser. No. 09/129,527, filed Aug. 5, 1998.

BACKGROUND OF THE INVENTION

The present invention relates to a mobile terminal that can integrally move between a infrastructure network and an ad hoc network and to a method of controlling the same. An infrastructure network in which networks such as internets are interconnected via a relay node such as a router as well as an ad hoc network which has no relay node and is a network temporarily configured of only terminals are well known as aspects of a network.

In order to establish communications by connecting a mobile terminal to a network, the mobile terminal must have (1) a terminal address used in a network to be connected, or a network address of the network itself and (2) an opposite communication party's address.

With respect to the item (1), the dynamic host configuration protocol, DHCP, (for example, refer to Douglas E. Corner, "Internetworking with TCP/IP Volume I principles, protocols and architecture", Third edition, 1995, Prentice-Hall, Inc.) is well known for an internet being an example of an infrastructure network. Moreover, with respect to the item (2), the domain name system, DNS, (for example, refer to Douglas E. Corner, "Internetworking with TCP/IP Volume I principles, protocols and architecture", Third edition, 1995, Prentice-Hall, Inc.) is well known. In the DHCP, a DHCP server is set up that holds a terminal address or infrastructure network address to be allocated to a terminal. Necessary values such as terminal or network addresses for connection are requested to the DHCP server when a terminal is connected to a network. The DHCP server provides parameters to the terminal without troubles due to duplicate terminal addresses, based on the request from the terminal. FIG. 15 depicts such an operation. When the terminal 1 and the terminal 2 are connected to a network, they respectively broadcast DHCP Requests containing desired information. FIG. 15 shows an example in which the terminals 1 and 2 request a terminal address. In response to the DHCP Request message, the DHCP server transmits a DHCP ACK message containing supply information to the request sources. In FIG. 15, the DHCP server transmits two DHCP ACK messages, one containing an address 1 and the other containing an address 2, to avoid overlapping of a terminal address at the terminals 1 and 2.

In the internet, the DNS (Domain Name System) is used to detect the correspondence between the terminal name of a terminal and the terminal address. The DNS introduces a DNS server that manages the correspondences between the terminal's names of terminals to be managed and the terminal addresses and predetermines the procedure of making inquiries from a terminal to the DNS server and the procedure of making inquiries between servers. In most cases, the address of the DNS server managing a terminal is set to the terminal itself FIG. 16 depicts the case where the terminal 1 detects the terminal address of the terminal 2. The terminal 1 transmits a DNS Query message requesting the terminal address of the terminal 2 to the DNS server (the DNS server 1 in FIG. 16) registered. The DNS server 1 inquires the DNS server (the DNS server 2 in FIG. 16) managing the terminal address of the terminal 2. Then the DNS server 1 notifies the terminal 1 of the address 2 (DNS Reply message) when obtaining the terminal address of the terminal 2 (address 2).

The ad hoc network is configured of only terminals and does not have a server such as DHCP server or DNS server used in the infrastructure network. For this reason, even if the same procedure as that in the infrastructure network are used, communications cannot be accomplished by connecting the terminal to an ad hoc network. In order to accomplish communications according to the same procedure as that in the infrastructure network, a server function may be added to one of terminals connected to an ad hoc network. However, since this approach requires a special terminal with a server function, it is considerably poor in versatility. In order to improve the versatility, a procedure different from that in the infrastructure network may be defined in the ad hoc network so that the procedure can be selectively used according to an ad hoc network or infrastructure network to be connected. However, in the case of this procedure, the terminal must be reset when it moves between an ad hoc network and an infrastructure network according to the procedure for an infrastructure network and the procedure for an ad hoc network to be introduced thereto.

SUMMARY OF THE INVENTION

The objective of the present invention is to solve the above-mentioned tasks.

Moreover, the objective of the invention is to provide a mobile terminal that can integrally move between an infrastructure network and an ad hoc network.

Furthermore, another objective of the present invention is to provide a mobile terminal control method that enables information regarding communications and connection to an ad hoc network to be effectively provided between mobile terminals in an ad hoc network.

The objective of the present invention is achieved by a mobile terminal that can be connected in a mobile mode between an infrastructure network and an ad hoc network, the infrastructure network being a permanent network interconnected via a relay node, the ad hoc network being a temporary network formed of only plural terminals, the infrastructure network having plural mobile terminals, relay nodes, and a server which provides information needed for connection of mobile terminals; and wherein an infrastructure network connection procedure and an ad hoc network connection procedure are configured in an integrated mode in an address management process, a connection network identification process and a destination address capture process which are needed when said mobile terminal is connected to a network to establish communications; wherein each process including steps of identifying whether a network to which the mobile terminal is connected is an ad hoc network or infrastructure network and then using a procedure corresponding to the connected network.

Moreover, a mobile terminal that can be connected in a mobile mode between an infrastructure network and an ad hoc network, the infrastructure network being a permanent network interconnected via a relay node, the ad hoc network being a temporary network formed of only plural terminals, the infrastructure network having plural mobile terminals, relay nodes, and a server which provides information needed for connection of mobile terminals, the mobile terminal comprises receive packet input means for inputting as a receive packet a packet transmitted onto a communication medium configuring a network to be connected; transmission packet output means for transmitting a transmission packet onto the communication medium; means for inputting an opposite communication party's name of the mobile terminal itself; means for outputting a destination address corresponding to the opposite communication party's name; address management means for receiving the receive signal, for identifying whether or not the network to be connected is the infrastructure network or ad hoc network, and for transmitting the transmission packet which captures and manages an address used in the network; destination address capture means for receiving the receive signal, for identifying whether or not the network to be connected is the infrastructure network or ad hoc network, for outputting the transmission packet to capture the destination address corresponding to the opposite communication party's name, and for obtaining a destination address of the opposite communication party's name; and move management means for receiving the receive packet and outputting the transmission packet to manage whether or not the movable terminal itself has moved from the network to be connected to another network.

In the mobile terminal according to the present invention, the address management means comprises ad hoc/infrastructure network identification means for identifying whether or not a network to be connected by the mobile terminal itself is the infrastructure network or the ad hoc network in response to the receive packet, for outputting a network identification signal representing a network to which a network to be connected by the mobile terminal itself is connected, for outputting an infrastructure network connection signal when the network to be connected is the infrastructure network, and for outputting an ad hoc network connection signal when the network to be connected is the ad hoc network; infrastructure network address management means for receiving the receive packet and the infrastructure network connection signal, for outputting necessary transmission data as the transmission packet, and for managing an address used by the mobile terminal itself when a network to be connected by the mobile terminal itself is an infrastructure network; ad hoc network address management means for receiving the receive packet and the ad hoc network connection signal, for outputting necessary data as the transmission packet, and for managing an address used by the mobile terminal itself when the network to be connected by the mobile terminal itself is an ad hoc network; and a switch for receiving the network identification signal, the transmission packet from the infrastructure network address management means, and the transmission packet from the ad hoc network address management means, for selectively outputting the transmission packet from the infrastructure network address management means by the network identification signal when a network in a connection state to the mobile terminal itself is an infrastructure network, and for selectively outputting the transmission packet from the ad hoc network address management means when the network in a connection state is an ad hoc network.

In the mobile terminal according to the present invention, the ad hoc/infrastructure network identification means comprises infrastructure network advertisement message receive means for receiving an infrastructure network advertisement message containing a network address of an infrastructure in response to the receive packet and for outputting an infrastructure network advertisement message receive signal representing that the infrastructure network advertisement message has been received when the infrastructure network advertisement message contains a network address equal to a network address of a network connected to the mobile terminal itself; ad hoc network advertisement message receive means for receiving an ad hoc network advertisement message containing a network address of an ad hoc network in response to the receive packet and for outputting an ad hoc network advertisement message receive signal representing that the ad hoc network advertisement message has been received when the ad hoc network advertisement message contains a network address equal to a network address of a network connected to the mobile terminal itself; a first counter for performing a reset operation by receiving the ad hoc network advertisement message receive signal and a reset signal, counting the number of ad hoc network advertisement messages, and outputting the number of the ad hoc network advertisement messages every time the reset signal is received; a second counter for performing a reset operation by receiving the infrastructure network advertisement message receive signal and the reset signal, counting the number of infrastructure network advertisement messages, and outputting the number of the infrastructure network advertisement messages every time the reset signal is received; a timer for measuring a predetermined period of time and then outputting the rest signal when a time-out occurs; an adder for adding an output from the first counter and an output from the second counter; a first comparator for comparing the output from the first counter with zero to obtain a result, outputting the result as the infrastructure network connection signal, and outputting data which creates the network identification signal; a second comparator for comparing the output from the second counter with zero to obtain a result and outputting the result to the decoder which creates the network identification signal and to an encoder which creates the ad hoc network connection signal; and a third comparator for comparing the output from the adder with zero to obtain a result and outputting the result to the decoder which creates the network identification signal and to an encoder which creates the ad hoc network connection signal; the decoder receiving signals from the first, the second, and the third comparators to create an infrastructure or ad hoc network connection signal; the encoder receiving signals from the second and the third comparators and then encoding the ad hoc network connection signal representing whether or not the mobile terminal itself configures a new ad hoc network or the mobile terminal itself is connected to an existing ad hoc network, based on the input signal.

In the mobile terminal according to the present invention, the ad hoc network address management means comprises ad hoc network/network address management means for receiving the receive packet and the ad hoc network connection signal, outputting a message requesting a network address containing a network address used in a new ad hoc network when a new ad hoc network is configured for connection as the transmission packet and a message representing a spent network address when the ad hoc network/network address request message containing the spent network address in an ad hoc network connected by the mobile terminal itself has been received, capturing a network address of an ad hoc network to which the mobile terminal itself is connected, based on the receive packet, outputting a network address captured signal representing that the captured network address and the network address have been captured, and managing the captured network address not to be used in an overlap mode; and an hoc network/terminal address management means for receiving the receive packet, the ad hoc network connection signal, the captured network address, and the network address captured signal, outputting as the transmission packet a message requesting a terminal address list being used in the ad hoc network when the mobile terminal is connected to an existing ad hoc network and a message containing the terminal address list held by the mobile terminal itself in response to the address list requesting message, capturing a terminal address used in ad hoc network to be connected by the mobile terminal itself, based on the receive packet and the ad hoc network connection signal, and acknowledging a terminal address to be used in the ad hoc network connected by the mobile terminal itself.

In the mobile terminal according to the present invention, the destination address capture means comprises ad hoc/infrastructure network identification means for receiving the receive packet, identifying whether or not a network to which the mobile terminal is connected is the infrastructure network of the ad hoc network, outputting a network identification signal representing a network to be connected to a network connected by the mobile terminal, outputting an infrastructure network connection signal when the network to be connected is the infrastructure network, and outputting an ad hoc network connection signal when the network to be connected is the ad hoc network; a first switch for receiving the name of the opposite communication party's name of the mobile terminal itself and the network identification signal and selecting a destination of the opposite communication party's name based on the network identification signal; infrastructure network/destination address capture means for receiving the infrastructure network connection signal and the opposite communication party's name, transmitting a message requesting a terminal address corresponding to the communication opponent's name, detecting a message containing a terminal address corresponding to the opposite communication party's name from the receive packet, and outputting the terminal address corresponding to the opposite communication party's name; ad hoc network/destination address capture means for receiving the ad hoc network connection signal and the opposite communication party's name, transmitting a message requesting a terminal address corresponding to the opposite communication party's name, detecting a message containing a terminal address corresponding to the opposite communication party's name from the receive packet, and outputting the terminal address corresponding to the opposite communication party's name; a second switch for selectively outputting a terminal address corresponding to the opposite communication party's name captured by the infrastructure network/destination address capture means and a terminal address corresponding to the opposite communication party's name captured by the ad hoc network/destination address capture means, based on the network identification signal; and a third switch for selectively transmitting a message requesting a terminal address corresponding to the opposite communication party's name capture by the infrastructure network/destination address capture means and a message requesting a terminal address corresponding the opposite communication party's name captured by the ad hoc/destination address capture means, based on the network identification signal.

In the mobile terminal according to the present invention, the ad hoc network/destination address capture means comprises destination terminal address detection means for receiving the network identification signal, starting up when a connection network of the mobile terminal itself is an ad hoc network, receiving the receive packet and the opposite communication party's name, outputting the terminal address of the opposite communication party's name by detecting a destination address message containing corresponding relationships between the opposite communication party's name and the opposite communication party's terminal address from the receive packet, and outputting a terminal address capture signal of the opposite communication party; destination terminal address request message output means for receiving the opposite communication party's name, broadcasting as the transmission packet a message requesting the correspondence relationship between the opposite communication party's name and the opposite communication party's terminal to a communication medium in which a connection network of the mobile terminal itself configures an ad hoc network, and outputting a timer start-up signal; a timer for starting measuring a predetermined period of time in response to the timer start-up signal, ceasing measurement of the predetermined period of time when a terminal address capture signal of the opposite communication party is received during measuring the predetermined period of time, and outputting a time-out signal representing a time-out when the measurement of the predetermined period of time ends; terminal address non-capture detection means for outputting a terminal address non-capture signal representing that a terminal address corresponding to the opposite communication party's name cannot be captured, when the time-out signal is received; a control circuit for outputting a switch control pulse that selects the terminal address non-capture signal when the time-out signal is input and selects a terminal address capture signal of the opposite communication party when a terminal address capture signal of the opposite communication party is input; a switch for selectively outputting the terminal address non-capture signal or the terminal address capture signal of the opposite communication party, based on the switch control pulse; destination terminal address request message detection means for detecting the destination terminal address request message in response to the receive packet and then outputting the destination address message transmission request signal when the destination terminal address request message requests a terminal address to the name of the mobile terminal itself; and destination terminal address message transmission means for broadcasting as the transmission packet the destination terminal address message containing its own terminal address to a communication medium in which a connection network of the mobile terminal configures an ad hoc network, when the destination address message transmission request signal is input.

In the mobile terminal according to the present invention, the ad hoc/infrastructure network identification means comprises infrastructure network advertisement message receive means for receiving an infrastructure network advertisement message containing a network address of an infrastructure network in response to the receive packet, and outputting an infrastructure network advertisement message receive signal representing that the infrastructure network advertisement message has been received when the infrastructure network advertisement message contains a network address equal to a network address of a network connected by the mobile terminal itself; ad hoc network advertisement receive means for receiving an ad hoc network advertisement message containing a network address of an ad hoc network in response to the receive packet, and outputting an ad hoc network advertisement message receive signal representing that the ad hoc network advertisement message has been received when the ad hoc network advertisement message contains a network address equal to a network address of a network connected by the mobile terminal itself; a first counter for performing a reset operation by receiving the ad hoc network advertisement message receive signal and a reset signal, counting the number of the ad hoc network advertisement messages, and outputting the number of the ad hoc network advertisement messages every time the reset signal is input; a second counter for performing a reset operation by receiving the infrastructure network advertisement message receive signal and a reset signal, counting the number of the infrastructure network advertisement messages, and outputting the number of the infrastructure network advertisement messages every time the reset signal is input; a timer for measuring a predetermined period of time and outputting the reset signal when a time-out occurs; a first comparator for comparing an output of the first counter with zero to determine a comparison result, and outputting the comparison result as the infrastructure network connection signal to the decoder that creates the network identification signal; and a second comparator for comparing an output of the second counter with zero to determine a comparison result, and outputting the comparison result as the ad hoc network connection signal to the decoder that creates the network identification signal; wherein the decoder that creates the network identification signal receives the infrastructure connection signal from the first counter and the ad hoc network connection signal from the second counter.

In the mobile terminal according to the present invention, the mobile management means comprises network advertisement request message transmission means for detecting the infrastructure network advertisement message or the ad hoc network advertisement message containing a network address of a network to which the mobile terminal is connected, in response to the receive packet, detecting that the mobile terminal has been moved to a different network when the infrastructure network advertisement message or the ad hoc network advertisement message cannot be received for a predetermined period of time, and transmitting the infrastructure network advertisement message or the ad hoc network advertisement request message requesting the network address of the network; and ad hoc network advertisement means for receiving the receive packet when a network to which the mobile terminal is connected is an ad hoc network, and transmitting the ad hoc network advertisement message representing the presence of the ad hoc network in cooperation with another mobile terminal connected to the ad hoc network.

In the mobile terminal according to the present invention, the network advertisement request message transmission means comprises infrastructure network advertisement message receive means for receiving an infrastructure network advertisement message containing a network address of an infrastructure network in response to the receive packet, and outputting an infrastructure network advertisement message receive signal representing that the infrastructure network advertisement message has been received when the infrastructure network advertisement message contains a network address equal to the network address of a network to which the mobile terminal itself is connected; ad hoc network advertisement message receiving means for receiving an ad hoc network advertisement message containing a network address of an ad hoc network in response to the receive packet, and for outputting an ad hoc network advertisement message receive signal representing that the ad hoc network advertisement message has been received when the ad hoc network advertisement message contains a network address equal to a network address of a network to which the mobile terminal itself is connected; a first counter for performing a reset operation by receiving the ad hoc network advertisement message receive signal and a reset signal, counting the number of ad hoc network advertisement messages, and outputting the number of the ad hoc network advertisement messages every time the reset signal is received; a second counter for performing a reset operation by receiving the infrastructure network advertisement message receive signal and the reset signal, counting the number of infrastructure network advertisement messages, and outputting the number of the infrastructure network advertisement messages every time said reset signal is received; a timer for measuring a predetermined period of time and then outputting the rest signal when a time-out occurs; an adder for adding an output from the first counter and an output from the second counter; a comparator for comparing the output from the adder with zero to obtain a result, and outputting an advertisement message non-receive signal when the result equals zero; infrastructure network advertisement request message transmission means for broadcasting the infrastructure network advertisement request message onto a communication medium used by the mobile terminal itself when the advertisement message non-receive signal is received; and ad hoc network advertisement request message transmission means for broadcasting the ad hoc network advertisement request message onto the communication medium used by the mobile terminal itself when said advertisement message non-receive signal is received.

Moreover, according to the present invention, a method of controlling a movable terminal, comprises the step of providing information to a first mobile terminal connected to an ad hoc network being a temporary network configured of only plural terminals, wherein another mobile terminal starts up a random timer in response to an information request from a mobile terminal; wherein the random timer allows only a terminal which has first occurred a time-out to supply information.

Furthermore, according to the present invention, a mobile terminal controlling method including a procedure of providing information to a mobile terminal, the mobile terminal being connected to an ad hoc network being a temporary network configured of only plural terminals, comprises the steps of broadcasting an information requesting message to all mobile terminals connected to the ad hoc network by means of a first mobile terminal connected to an ad hoc network; starting up the random timer by means of each of the mobile terminals configuring the ad hoc network which receives the information requesting message, the random timer measuring a random time; broadcasting information supply message corresponding to the information requesting message to all mobile terminals connected to the ad hoc network by means of a mobile terminal in which time-out of the random timer has occurred among mobile terminals which have started up the random timer; and ceasing the random timer when each of the mobile terminals which have started up the random timer receives the information supply message and then stopping the information supply message from being transmitted.

Moreover, a method of controlling a mobile terminal, comprises the step of providing information from a terminal with a shortest ad hoc network connection time when information is provided to a first mobile terminal connected to said ad hoc network being a temporary network configured of only plural terminals.

Furthermore, according to the present invention, a mobile terminal controlling method including a procedure of providing information to a mobile terminal, the mobile terminal being connected to an ad hoc network being a temporary network configured of only plural terminals, comprises the steps of broadcasting an information request message to all mobile terminals connected to an ad hoc network by means of a first mobile terminal connected to the ad hoc network; determining an ad hoc network connection time based on a time connected to the ad hoc network and a time at which the information requesting message has been received, by means of each of mobile terminals configuring the ad hoc network which has received the information request message; starting up a timer that measures a time according to a period of time for which a mobile terminal is connected to the ad hoc network; and broadcasting a response message corresponding to the information requesting message when time-out of the timer has occurred, ceasing the timer; and halting the timer when a response message is received to the information requesting message during an operation of the timer.

According to the first aspect of the present invention, the mobile terminal can move between an infrastructure network and an ad hoc network without performing a reset operation.

According to the second aspect of the present invention, the mobile terminal control method can prevent information to be provided in an overlap state.

Moreover, according to the third aspect of the present invention, the mobile terminal control method can provide latest information and prevent information to be provided in an overlap state.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The mobile terminal and the method of controlling the same according to the present invention will be described below by referring to the attached drawings.

Figure 1:
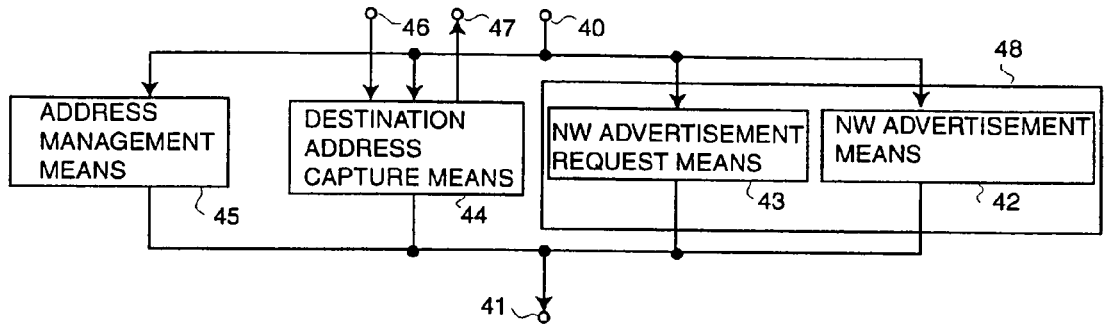
FIG. 1 is a block diagram illustrating the main configuration of a mobile terminal according to the first aspect of the present invention.

FIG. 1 illustrates the main configuration of the mobile terminal according to a first aspect of the present invention. Referring to FIG. 1, numeral 40 and 46 represent input terminals; 41 and 47 represent output terminals; 42 represents ad hoc network advertisement means; 43 represents ad hoc/infrastructure network integration advertisement request means; 44 represents ad hoc/infrastructure network destination address capture means; 45 represents ad hoc/infrastructure network integration address management means; and 48 represents ad hoc/infrastructure integration move management means. Packets on communication medium for the mobile terminal are input as receive packets via the input terminal 40. The packets are input to the ad hoc/infrastructure integration move management means 48, the ad hoc/infrastructure network integration advertisement request means 43, the ad hoc/infrastructure network integration destination address capture means 44, and the ad hoc/infrastructure network integration address management means 45 via the input terminal 40. The above-mentioned system transmits necessary packets to be processed to the communication medium connected via the output terminal 41, judged whether or not a network connected to the mobile terminal is an ad hoc network or infrastructure network, using receive packets, and implements address control necessary for network connection control of the mobile terminal, capture of a destination terminal address necessary for communication control, and move control of the mobile terminal. The ad hoc/infrastructure network integration destination address capture means 44 outputs either a destination terminal address corresponding to a destination terminal's name input from the input terminal 46 or information regarding a terminal corresponding to an input destination terminal's name not connected to the network, to the output terminal 47. The ad hoc/infrastructure integration move management means 48 consists of ad hoc/infrastructure network integration network advertisement request means 43 for requesting both an ad hoc network advertisement message containing a network address of ad hoc network and an infrastructure network advertisement message containing a network address of an infrastructure network; and ad hoc network advertisement means 42 for transmitting ad hoc network advertisement message to advertise the presence of an ad hoc network.

Figure 2:
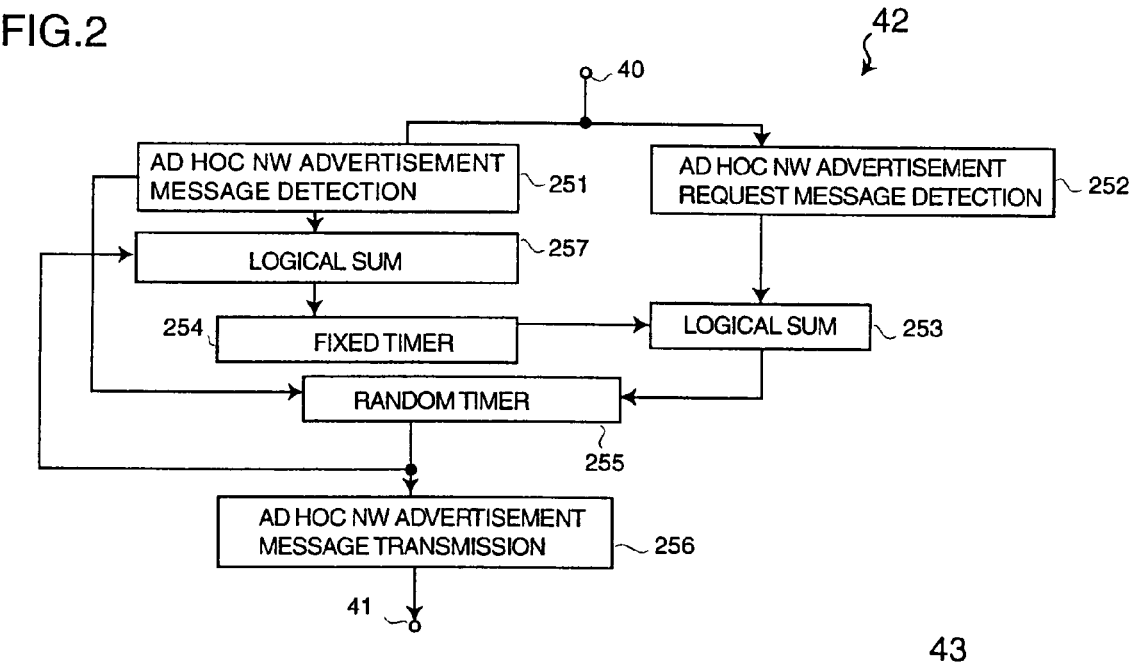
FIG. 2 is a block diagram illustrating the configuration of the ad hoc NW integration NW advertisement means in the mobile terminal according to the present invention.

Referring to FIG. 1, the ad hoc network advertisement means 42 can be configured, for example, as shown in FIG. 2. Referring to FIG. 2, numeral 40 represents an input terminal; 251 represents ad hoc network advertisement message detection means; 252 represents ad hoc network advertisement request message detection means; 253 and 257 represent a logical sum arithmetic circuit; 254 represents a fixed timer; 255 represents a random timer; 256 represents ad hoc network advertisement transmission means; and 41 represents an output terminal. In an infrastructure network, as shown by "C. perkins, "IP Mobility Support", Request for Comment: 2002, RFC2002, October 1996, a mobile agent which exists in an infrastructure network periodically broadcasts an agent advertisement message being information containing addresses of the mobility agent itself and the number of bits (net mask) used as a network address among the addresses. By receiving the message, the mobile terminal detects move between infrastructure networks to be connected. The mobile terminal on an infrastructure network can send an agent solicitation message to request agent advertisement message broadcasting. The mobile agent sends an agent advertisement message in response to the agent advertisement request message. In this embodiment, an agent advertisement message is called an infrastructure network advertisement message while an agent solicitation message is called an infrastructure network advertisement request message.

In contrast, since there is no node functioning as a server such as a mobility agent in the ad hoc network, a mobile terminal itself sends an ad hoc network advertisement message containing network addresses in the ad hoc network connected thereto and, if required, an ad hoc network advertisement message. The ad hoc network integration network advertisement means 42 controls a ad hoc network advertisement message in the mobile terminal. The ad hoc network integration network advertisement means 42 controls transmission of an ad hoc network advertisement message using the method of controlling a mobile terminal according to the second aspect of the present invention. The ad hoc network advertisement message detection means 251 receives a receive packet input via the input terminal 40 and then detects an ad hoc network advertisement message. The ad hoc network advertisement request message detection means 252 receives a receive packet input via the input terminal 40 and then detects an ad hoc network advertisement request message. The ad hoc network advertisement message detection means 251 outputs an ad hoc network advertisement message detection pulse to the logical sum arithmetic circuit 257 and outputs a random timer halt pulse to the random timer 255. The ad hoc network request message detection means 252 outputs an ad hoc network advertisement request message receive pulse to the logical sum arithmetic circuit 253. The logical sum arithmetic circuit 257 receives an ad hoc network advertisement message detection pulse as well as a random timer time-out pulse output out of the random timer 255 and then outputs as a fixed timer activation pulse the resultant logical sum to the fixed timer 254. The fixed timer 254 is reset every time the fixed timer start-up pulse is input. The fixed timer 254 measures a predetermined period of time and then outputs a fixed timer time-out pulse to the logical sum arithmetic circuit 253 when a time-out occurs. The logical sum arithmetic circuit 253 receives an ad hoc network advertisement request message receive pulse and a fixed timer time-out pulse and then outputs as a random timer start-up signal the resultant logical sum to the random timer 255. The random timer 255 starts measuring the time to be randomly set every time being started up in response to the random timer start-up pulse. The random timer 255 is reset every time the random timer halt pulse is input. When the random timer 255 becomes time-out, it outputs the random timer time-out pulse to the ad hoc network advertisement message transmission means 256 and the logical sum arithmetic circuit 257. The ad hoc network advertisement transmission means 256 starts up every time the random timer time-out pulse is input and then configures the ad hoc network advertisement message as a broadcast packet, thus outputting it via the output terminal 41.

Figure 3:
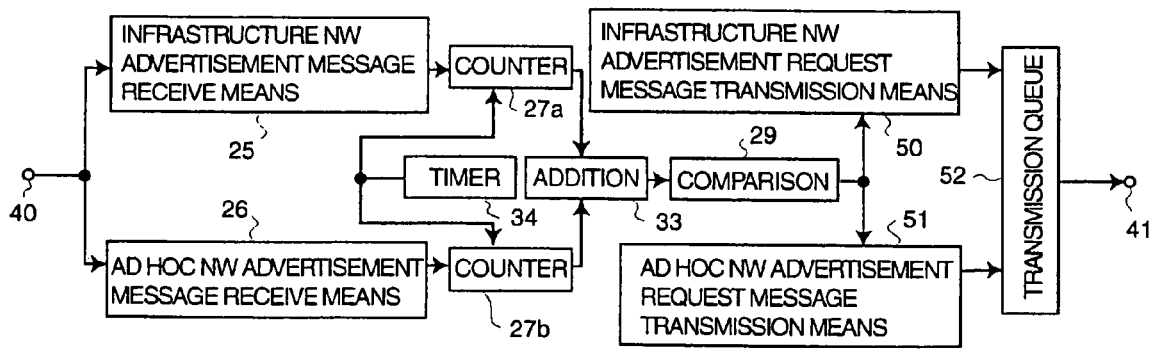
FIG. 3 is a block diagram illustrating the configuration of the ad hoc/infrastructure NW integration NW advertisement request means in FIG. 1.

In FIG. 1, the ad hoc/infrastructure network integration network advertisement request means 43 can be configured as shown in FIG. 3. Referring to FIG. 3, numeral 40 represents an input terminal; 41 represents an output terminal; 25 represents infrastructure network advertisement message receive means; 26 represents ad hoc network advertisement message receive means; 27a and 27b represent counters; 34 represents a timer; 33 represents an adder; 29 represents a comparator; 50 represents infrastructure network advertisement request message transmission means; 51 represents ad hoc network advertisement request message transmission means; and 52 represents a transmission queue. A packet is input to the infrastructure network advertisement request message transmission means 25 and the ad hoc network advertisement message receive means 26 via the input terminal 40. The infrastructure network advertisement message receive means 25 outputs a pulse to the counter 27a every time it detects an infrastructure network advertisement message based on the input packet. The ad hoc network advertisement message receive means 26 outputs a pulse to the counter 27b every time it detects an ad hoc network advertisement message based on the input packet. Each of the counters 27a and 27b counts up the number of input pulses. In response to a reset pulse from the timer 34, the counters 27a and 27b output respective count-up values to the adder 33. The timer 34 measures a predetermined period of time and then sends a reset pulse to the counters 27a and 27b when the time-out occurs while starting up. The adder 33 adds the output from the counter 27a with the output from the counter 27b and then outputs the sum to the comparator 29. The comparator 29 compares the output from the comparator with zero and then outputs a pulse representing zero or other status to the infrastructure network advertisement request message transmission means 50 and the ad hoc network advertisement request message transmission means 51. When the input pulse indicates zero, each of the infrastructure network advertisement request message transmission means 50 and the ad hoc network advertisement request message transmission means 51 judges that the mobile terminal has moved and then outputs a broadcast packet configured of an infrastructure network advertisement request message and an ad hoc network advertisement request message to the transmission queue 52 to capture the network after movement. The transmission queue 52 transmits as a broadcast packet the infrastructure network advertisement request message and an ad hoc network advertisement request message onto the communication medium via the output terminal 41.

Figure 4:
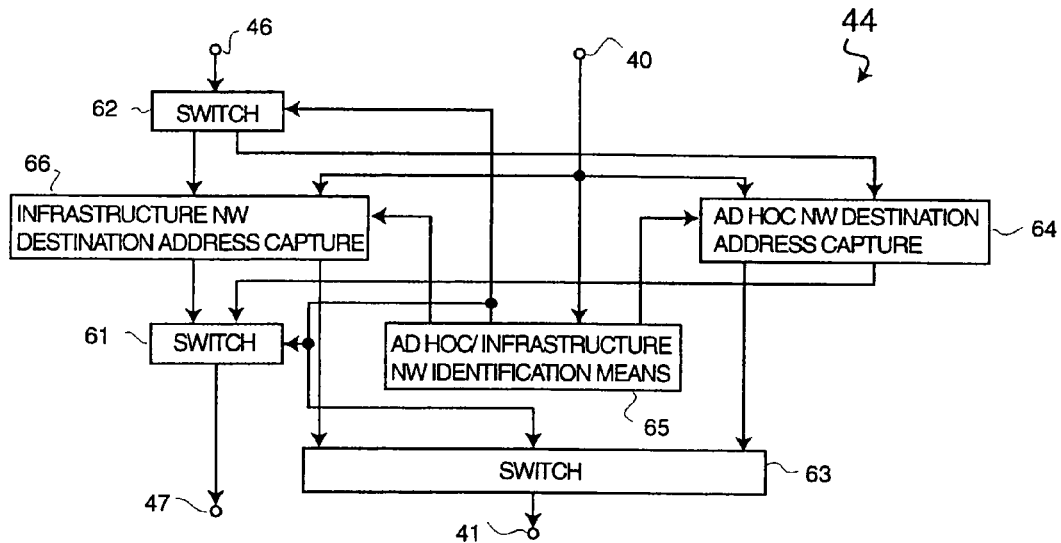
FIG. 4 is a block diagram illustrating the configuration of the ad hoc/infrastructure NW integration destination address capture means in FIG. 1.

The ad hoc/infrastructure network integration destination address capture means shown in FIG. 1 can be configured as shown in FIG. 4. In FIG. 4, numerals 40 and 46 represent input terminals; 41 and 47 represent output terminals; 64 represents ad hoc network destination address capture means; 66 represents infrastructure network destination address capture means; 65 represents ad hoc/infrastructure network destination address capture means; and 61 to 63 represent switches. The ad hoc/infrastructure network identification means 65 identifies whether or not the network connected to the mobile terminal is an ad hoc network or infrastructure network by the packet input via the input terminal 40. When the mobile terminal is connected to the ad hoc network, the ad hoc/infrastructure network identification means 65 controls the switches 61 and 63 to select the output from the ad hoc network destination address capture means 64. while it starts up the ad hoc network destination address capture means 64. The ad hoc network destination address capture means 64 and the infrastructure network destination address capture means 66 receive a destination terminal name from the input terminal 64 and then transmit a destination terminal address request message onto the communication medium via the output terminal 41. The infrastructure network destination address capture means 66 also receives a receive packet from the input terminal 40 and a destination terminal address response message responded to the transmitted destination terminal request message and then outputs the result to the output terminal 47. The destination terminal address response message contains a requested destination terminal name and a destination terminal address.

Figure 5:
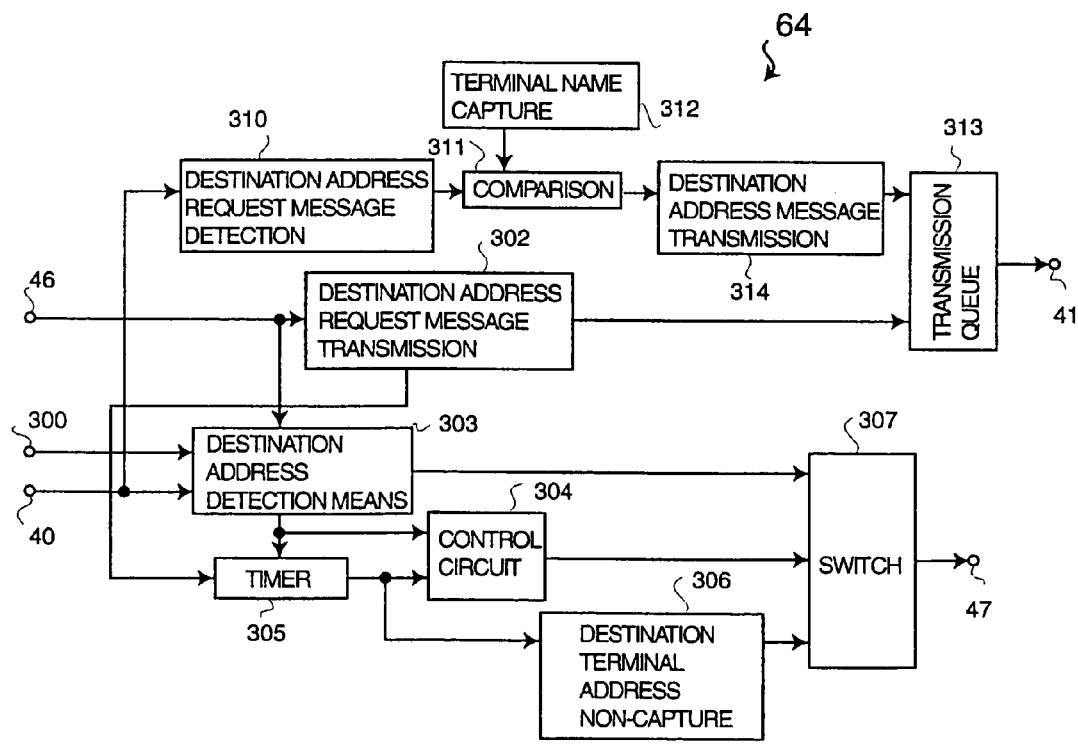
FIG. 5 is a block diagram illustrating the configuration of the ad hoc NW destination address capture means in FIG. 4.

The ad hoc network destination address capture means 64 shown in FIG. 4 can be configured as shown in FIG. 5. Referring to FIG. 5, numerals 40, 46 and 300 represent input terminals; 47 and 41 represent output terminals; 302 represents destination terminal address request message transmission means; 303 represents destination address detection means; 304 represents a control circuit; 305 represents a timer; 306 represents destination terminal address non-capture message generation means; 307 represents a switch; 310 represents destination terminal address request message detection means; 311 represents a comparator; 312 represents a self terminal name capture means; and 313 represents transmission means. The ad hoc/infrastructure network identification means 65 starts up the destination address detection means 303 in response to a start-up signal input via the input terminal 300. A destination terminal name is supplied to the destination terminal address message request transmission means 302 and the destination address detection means 303 via the input terminal 46. The destination terminal address message request transmission means 302 configures the destination terminal address request message containing the destination terminal name as a broadcast packet for all terminals connected to the ad hoc network. The destination terminal address message request transmission means 302 outputs the broadcast packet to the output terminal 41 via the transmission queue 313 and a timer start-up pulse to the timer 305 to start up the timer 305. The destination address detection means 303 extracts a destination terminal address response message from the receive packet input via the input terminal 40 and detects an address corresponding to a destination terminal address name a receive packet supplied via the input terminal 46. Then the destination address detection means 303 outputs the detected address to the switch 307 while it outputs an address detection pulse representing address detection to the timer 305 and the control circuit 304. The timer 305 is reset in response to an address detection pulse. When the timer 305 becomes a time-out after start-up, a time-out pulse representing a time-out is output to the control circuit 304 and the destination terminal address non-capture message generation means 306. The control circuit 304 controls the switch 307 to output a message showing that the destination terminal address input from the destination terminal address non-capture message generation means 306 cannot be captured and an output from the destination address detection means 303, to the output terminal 47. The destination address request message detection means 310 detects a destination address request message in response to a receive packet from the input terminal 40 and then extracts a terminal name of which a destination address is required. The comparator 311 receives a terminal name from the destination address request message detection means 310 and a self terminal name. When the terminal name is equal to the self terminal name, the comparator 311 starts up the destination address message transmission means 314. The destination address message transmission means 314 creates a destination address message containing the terminal name and the terminal address of a self terminal and then outputs the transmission queue 313 to transmit a broadcast packet onto a communication medium.

Figure 6:
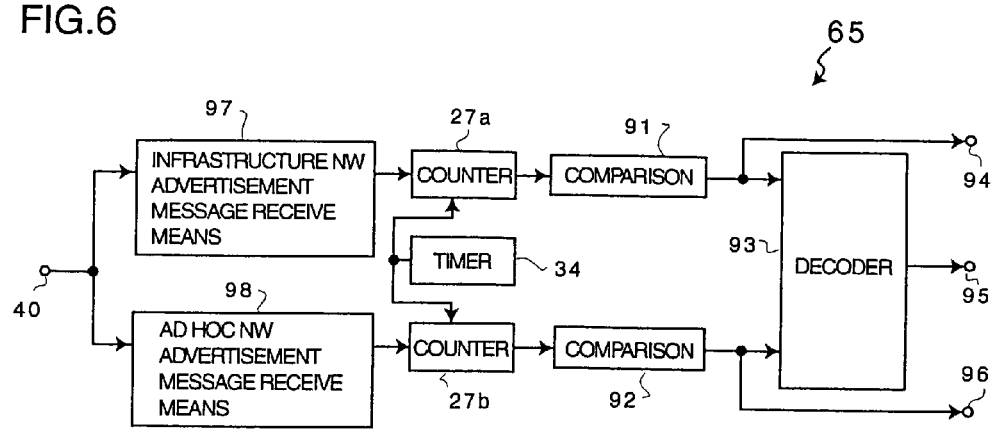
FIG. 6 is a block diagram illustrating the configuration of the ad hoc/infrastructure NW identification means 65 in FIG. 4.

The ad hoc/infrastructure network identification means 65 shown in FIG. 4 can be configured as shown in FIG. 6. Referring to FIG. 6, numeral 40 represents an input terminal; 94 to 96 represent output terminals; 97 represents infrastructure network advertisement message receive means; 98 represents ad hoc network advertisement message receive means; 27a and 27b represent counters; 34 represents a timer; 91 and 92 represent comparators; and 93 represents decoder. In response to an input packet, the infrastructure network advertisement message receive means 97 detects an infrastructure network advertisement message containing the network address of a network connected to the mobile terminal and then outputs a message detection pulse to the counter 27a. In response to an input packet, the ad hoc network advertisement message receive means 98 detects an ad hoc network advertisement message containing the network address of a network connected to the mobile terminal and then outputs a message detection pulse to the counter 27b. The counter 27a counts up every time the message detection pulse is input and then receives a reset pulse when the timer 34 become time-out. The counter 27b counts up every time the message detection pulse is input and then receives a reset pulse when the timer 34 become time-out. In response to a reset pulse, the counter 27a outputs the count number of message detection pulses at the reset time to the counter 91. In response to a reset pulse, the counter 27b outputs the count number of message detection pulses at the reset time to the counter 92. The comparator 91 compares the input signal with zero and then outputs a pulse representing zero or other value. The comparator 92 compares the input signal with zero and then outputs a pulse representing zero or other value. The comparator 91 outputs a pulse representing that the input signal is not zero, as a pulse starting up the infrastructure network destination address capture means 66, to the output terminal 94. When the comparator 92 outputs a pulse representing that the input signal is not zero, as a pulse starting up the infrastructure network destination address capture means 64, to the output terminal 95. The decoder 93 receives the signal from the comparator 91 and the signal from the comparator 92. When the comparator 91 outputs a pulse representing that the input signal is not zero, the decoder 93 outputs a control signal to the switches 61 and 65 to selectively output an output from the infrastructure network destination address capture means 66 and outputs a control signal to the switch 61 to output an input signal to the infrastructure network destination address capture means 66. When the comparator 92 outputs a pulse representing that the input signal is not zero, the decoder 93 outputs a control signal to the switches 61 and 65 to selectively output an output from the ad hoc network destination address capture means 64 and outputs a control signal to the switch 61 to output an input signal to the ad hoc network destination address capture means 64.

The infrastructure destination address capture means 66 shown in FIG. 4 can be realized using the domain network system that inquires a terminal address corresponding to a destination terminal name and then notifies the mobile terminal inquired by a server of the destination terminal address (refer to Douglas E. Corner, "Internetworking with TCP/IP Volume I Principles, protocols and architecture", Third edition, 1995, Prentice-Hall, Inc.).

Figure 7:
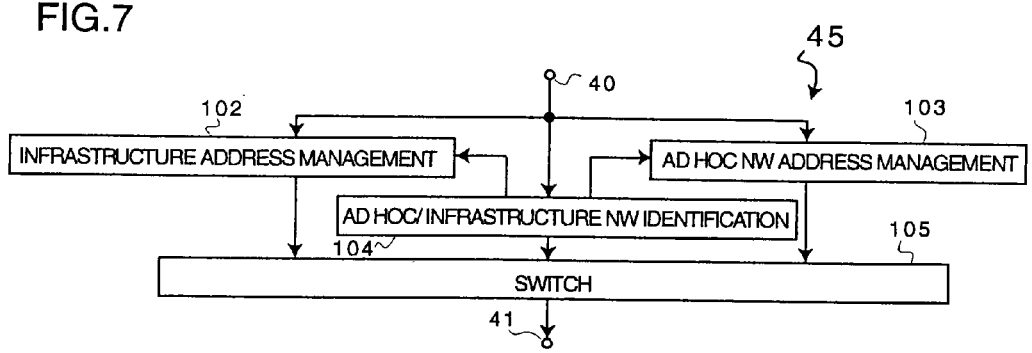
FIG. 7 is a block diagram illustrating the configuration of the ad hoc/infrastructure NW integration address management means in FIG. 1.

The ad hoc/infrastructure network integration address management means 45 shown in FIG. 1 can be configured a shown in FIG. 7. Referring to FIG. 7, numeral 40 represents an input terminal; 41 represents an output terminal; 102 represents infrastructure network address management means; 103 represents ad hoc network address management means; 104 represents ad hoc/infrastructure network integration identification means; and 105 represents a switch. Based on the receive packet from the input terminal 40, the ad hoc/infrastructure network integration network identification means 104 starts up the ad hock network management means 103 when the mobile terminal is connected to an ad hoc network and starts up the infrastructure network management means 102 when the mobile terminal is connected to an infrastructure network. The ad hoc/infrastructure network integration network identification means 104 selects the output from the ad hoc network address management means 103 or infrastructure network address management means 102 in a start-up state by controlling the switch 105 and outputs it to the output terminal 41.

Figure 8:
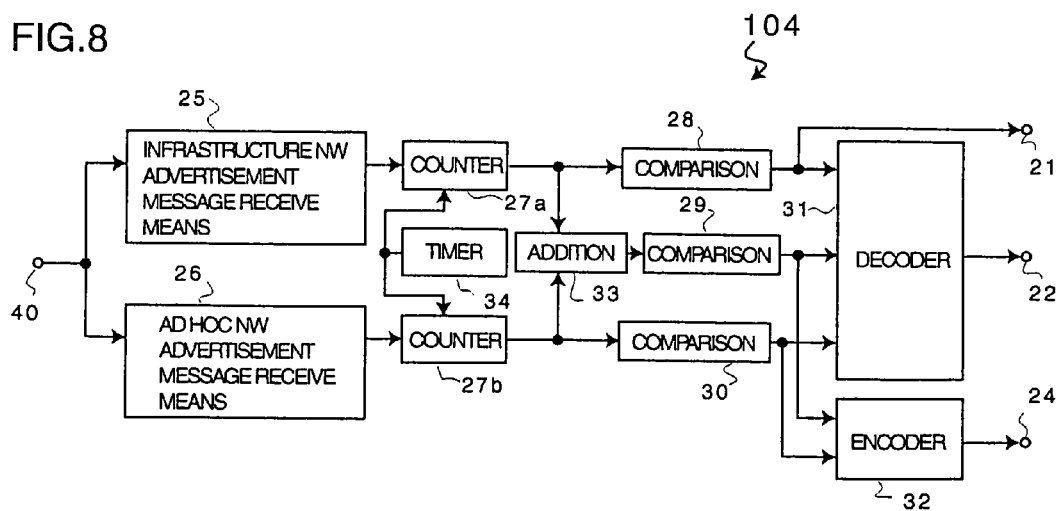
FIG. 8 is a block diagram illustrating the configuration of the ad hoc/infrastructure NW identification means in FIG. 7.

The ad hoc/infrastructure network identification means 104 shown in FIG. 7 can be configured as shown in FIG. 8. Referring to FIG. 8, numerals 40 represents an input terminal; 21, 22, and 24 represents output terminals; 25 represents infrastructure network advertisement message receive means; 26 represents ad hoc network advertisement message receive means; 27a and 27b represent counters; 28, 29 and 30 represent comparators; 31 represents a decode; 32 represents an encoder; 33 represents an adder; and 34 represents a timer. A receive packet is input to the infrastructure network advertisement message receive means 25 and the ad hoc network advertisement message receive means 26 via the input terminal 40. When the infrastructure network advertisement message receive means 25 detects an infrastructure network advertisement message, it outputs a message detection pulse to the counter 27a. When the ad hoc network advertisement message receive means 26 detects an ad hoc network advertisement message, it outputs a message detection pulse to the counter 27b. The counter 27a counts up every time the message detection pulse is input while it receives a reset pulse output when the timer 34 becomes time-out. The counter 27b counts up every time the message detection pulse is input while it receives a reset pulse output when the timer 34 becomes time-out. In response to the reset pulse, the counter 27a outputs the count number of message detection pulses at the reset time to the comparator 28 and then resets the count number. In response to the reset pulse, the counter 27b outputs the count number of message detection pulses at the reset time to the comparator 28 and then resets the count number. The adder 33 adds the output from the counter 27a and the output from the counter 27b and outputs the sum to the comparator 29. Each of the comparators 28, 29 and 30 compares an input signal with zero and then outputs a pulse representing whether or not the input signal is zero. The comparator 28 the pulse to the output terminal 21 and the decoder 31. The pulse from the output terminal 21 representing that the input signal is not zero is output as a start-up signal for the infrastructure network address management means 102. The comparator 29 outputs the pulse to the decoder 31 and the encoder 32 while the comparator 30 outputs the pulse to the decoder 31 and the encoder 32. The decoder 31 outputs a control pulse to the switch 105. The control pulse means that (1) the infrastructure network address management means 102 outputs its output to the output terminal 41 when the decoder 31 receives a pulse representing that the input signal is not zero, from the comparator 28, that (2) the ad hoc network address management means 103 outputs its output to the output terminal 41 when the decoder 31 receives a pulse representing that the input signal is zero, from the comparator 29, and that (3) the ad hoc network address management means 103 outputs its output to the output terminal 41 when the decoder 31 receives a pulse representing that the input signal is not zero, from the comparator 30. The encoder 32 receives output pulses from the omparators 29 and 30, encodes (1) a signal representing a new ad hoc network configuration when the decoder 32 receives a pulse representing that the input signal is not zero from the comparator 29 and (2) a signal representing a pulse configuration showing connection to an existing ad hoc network when the decoder 32 receives a pulse representing that the input signal is not zero from the comparator 30, and then outputs the encoded signal as a start-up pulse to the ad hoc network address management means 103 to the output terminal 24.

The infrastructure network address management means 102 captures the terminal address of the mobile terminal and the network address of the infrastructure network. This can be realized by, for example, the dynamic host configuration protocol (DHCP) (for example, refer to Douglass E. Corner, "internetworking with TCP/IP Vplume I Principles, protocols and architecture", Third edition, 1995, Prentice-Hall, Inc.). In the DHCP, a DHCP server is installed that manages terminal addresses and network addresses on an infrastructure network to supply a terminal address and a network address based on a request of the mobile terminal.

Figure 9:
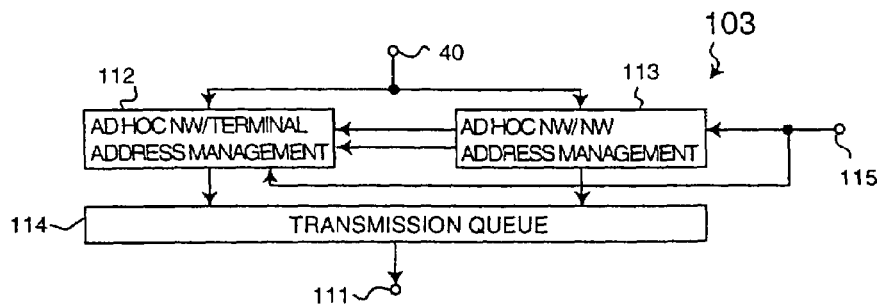
FIG. 9 is a block diagram illustrating the configuration of the ad hoc NW address management means in FIG. 7.

In contrast, the ad hoc network address management means 103 shown in FIG. 7 can be configured as shown in FIG. 9. Referring to FIG. 9, numerals 40 and 115 represent input terminals; 111 represents an output terminal; 112 represents ad hoc network/terminal address management means; 113 represents ad hoc network/network address management means; and 114 represents a transmission queue. Each of the ad hoc network/terminal address management means 112 ad the ad hoc/network address management means 113 receives receive packets via the input terminal 40 for management operation. The ad hoc network/terminal address management means 112 outputs messages for management to the transmission queue 114, thus sending it to the switch 105 via the output terminal 111. The ad hoc network/network address management means 113 outputs messages for management to the transmission queue 114, thus sending it to the switch 105 via the output terminal 111. Each of the ad hoc network/terminal address management means 112 and the ad hoc network/network address management means 113 receives a signal representing whether or not the output terminal 24 (shown in FIG. 8) is connected to a newly configured ad hoc network, or is connected to the existing ad hoc network. The ad hoc network/network address management means 113 outputs a network address of an ad hoc network to be connected and a network address captured signal showing network address capture completion to the ad hoc network/terminal address management means 112.

Figure 10:
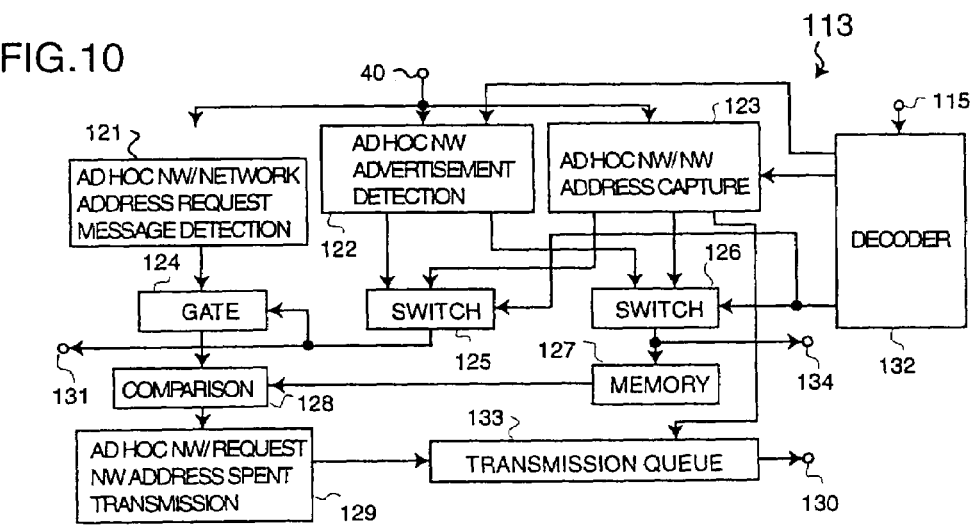
FIG. 10 is a block diagram illustrating the configuration of the ad hoc NW/network address management means in FIG. 9.

The ad hoc network/network address management means 113 shown in FIG. 9 is configured as shown in FIG. 10. Referring to FIG. 10, numerals 115 and 40 represents input terminals; 113, 131 and 134 represent output terminals; 121 represents ad hoc network/network address request message detection means; 122 represents ad hoc network advertisement message detection means; 123 represents ad hoc network/network address capture means; 124 represents a gate; 125 an 126 represent switches; 127 represents a memory; 128 represents a comparator; 129 represents ad hoc network/request network address spent message transmission means; and 133 represents a transmission queue. The decoder 132 decodes an input signal sent via the input terminal 115. As a result, when the input signal represents new ad hoc network configuration, the decoder 132 starts up the ad hoc network/network address capture means 123 and controls the switches 125 and 126 to select the output from the ad hoc network/network address capture means 123. When the system is connected to the existing ad hoc network, the decoder 132 starts up the ad hoc network advertisement message detection means 122 and controls the switches 125 and 126 to slet the output from the ad hoc network advertisement message detection means 122.

Let us now explain the case where the system is connected to an existing ad hoc network. The ad hoc network advertisement message detection means 122 is started up. Then the ad hoc network advertisement message detection means 122 receives a receive packet input via the input terminal 40, detects an ad hoc network advertisement message containing the network address of an ad hoc network, and extracts the network address of the ad hoc network. The mobile terminal is connected to the network using the network address. The switch 126 sends the network address to the output terminal 134 and the memory 127. The switch 125 sends a network address captured signal representing that a network address has been captured, to the gate 124 and the output terminal 131. In response to the network address captured signal, the gate 124 passes the output of the ad hoc network/network address request message detection means 121. The ad hoc network/network request message detection means 121 receives a receive packet via the input terminal 40. When a new ad hoc network is configured, the ad hoc network/network request message detection means 121 detects an ad hoc network/network address request message and then extracts a required network address. The ad hoc network address request message contains a desired network address and is broadcast onto the communication medium. The required network address passes through the gate 124. The comparator 128 compares the requested network address with the ad hoc network address of the currently-connected ad hoc network stored in the memory 127. When the network address agrees with the network address stored in the memory 127, the ad hoc network/request network address spent message transmission means 129 is started up to transmit as a broadcast packet an ad hoc network/request network address spent message representing the network is in use. The ad hoc network/request network address spent message transmission means 129 configures an ad hoc network/request network address spent message and then outputs it to the transmission queue 114 via the transmission queue 133 and the output terminal 130.

Figure 11:
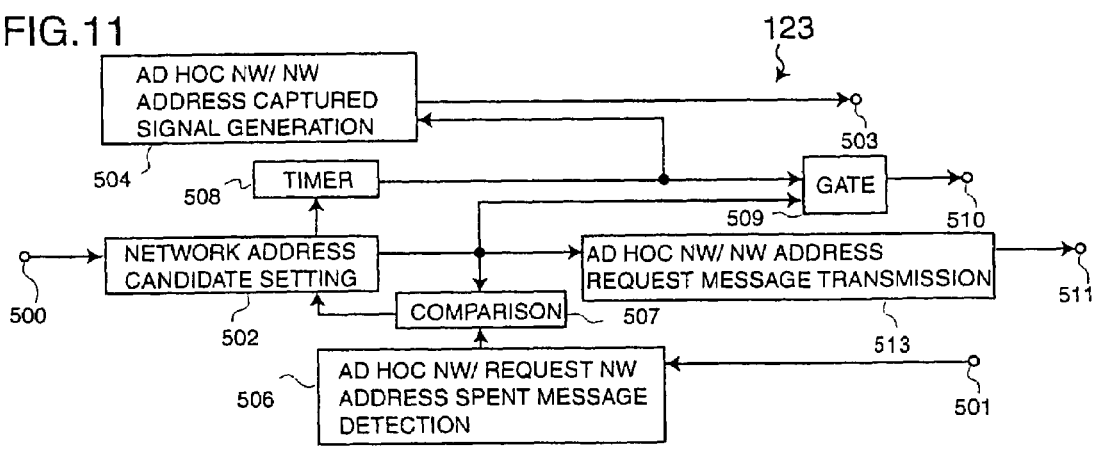
FIG. 11 is a block diagram illustrating the configuration of the ad hoc NW/network address capture means in FIG. 10.

Next, explanation will be made as to the case where a new ad hoc network is configured. In this case, the ad hoc network/network address capture means 123 starts up. The ad hoc network/network address capture means 123 shown in FIG. 10 can be realized as shown in FIG. 11. Referring to FIG. 11, numerals 500 and 40 represent input terminals; 503, 510 and 511 represent output terminals; 502 represents network address candidate setting means; 513 represents ad hoc network/network address request message transmission means; 504 represents ad hoc network/network address captured signal detection means; 506 represents ad hoc network/request network address spent message detection means; 507 represents a comparator; 508 represents a timer; and 509 represents a gate. The network address candidate setting means 502 receives a signal from the decoder 132 via the input terminal 500 and then outputs the network address candidate of an ad hoc network to be configured while it starts up the timer 508. The ad hoc network/network address request message transmission means configures an ad hoc network/network address request message using the input network address candidate and then outputs it as a broadcast packet to the transmission queue 133 to transmit onto the communication medium via the output terminal 511. The ad hoc network/request network address spent message detection means 506 receives a packet on the communication medium via the input terminal, detects an ad hoc network/request network address spent message, and then extracts a spent network address to output to the comparator 507. The comparator 507 compares the spent network address from the ad hoc network/request network address spent message detection means 506 with a network address candidate from the network address candidate setting means 502. If both the addresses are agreed, the comparator 507 re-starts up the network address candidate setting means 502 and then outputs a different network address as a network address candidate. At this time, the network address candidate setting means 502 restarts up the timer 508.

The time-out of the timer 508 means that an ad hoc network/request network address spent message of the network address candidate as a spent network address is not received within the measurement time of the timer 508. The network address candidate is used as the network address of a new ad hoc network. Thus, when the timer 508 becomes a time-out, a time-out signal is output to the gate 509 and the ad hoc network/network address captured signal generation means 504. In response to the time-out signal, the gate 509 opens to output as a captured network address the network address candidate from the network address candidate setting means 502 to the switch 128 via the output terminal 511. The ad hoc network/network address captured signal generation means 504 outputs a network address captured signal to the switch 125 via the output terminal 503.

Figure 12:
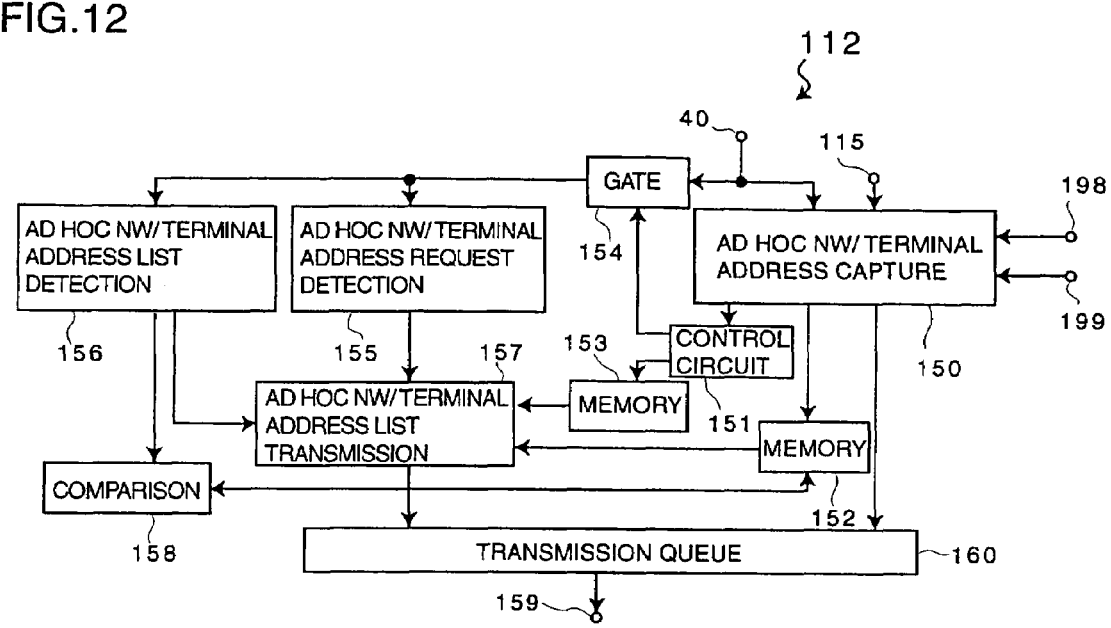
FIG. 12 is a block diagram illustrating the configuration of the ad hoc NW/terminal address management means in FIG. 9.

The ad hoc network/terminal address management means 112 shown in FIG. 9 can be configured as shown in FIG. 12. Referring to FIG. 12, numerals 115, 198, 199 and 40 represent input terminals; 159 represents an output terminal; 150 represents ad hoc network/terminal address capture means; 151 represents a control circuit; 152 and 153 represent memories; 154 represents a gate; 155 represents ad hoc network/terminal address request message detection means; 156 represents ad hoc network/terminal address list detection means; 157 represents ad hoc network/terminal list transmission means; 158 represents a comparator; and a transmission queue 160. The ad hoc network/terminal address capture means 150 receives a signal from the output terminal 24 via the input terminal 115, a network address captured signal from the output terminal 134 via the input terminal 199, a capture network address from the output terminal 131 via the input terminal 199; and a packet sent from the input terminal 40. The transmission queue 160 receives a necessary message as a broadcast packet transmits to the transmission queue via the output terminal 159. When capturing a 1~erminal address, the ad hoc network/terminal address capture means 150 outputs a terminal address captured signal to the control circuit 151 and a terminal address list to the memory 152. When receiving a terminal address captured signal, the control circuit 151 opens the gate 154 while it stores the open time into the memory 153.

When the gate 154 opens after the capture of the terminal address, the receive packet from the input terminal 40 is input to the ad hock network/terminal address request detection means 155 and the ad hoc network/terminal address list detection means 156. When detecting an ad hoc network/ terminal address list request message requesting the address list of a terminal connected to the ad hoc network, the ad hock network/terminal address request detection means 155 starts up the ad hoc network/terminal address list transmission means 157 to starts transmitting the address list held. At the startup, the ad hoc network/terminal address list transmission means 157 configures as a broadcast packet an address list stored in the memory 152 and an address network/address list message containing the address list based on the time the terminal is connected to the network and then outputs it the communication medium via the transmission queue 160. When receiving an ad hoc network/ terminal address list message containing the address list, the ad hoc network/terminal address list detection means 156 halts the operation of the ad hoc network/terminal address list transmission means 157 while it extracts the address list from a received message. Then, the address list is output to the comparator 158. The comparator 158 compares the received address list with the address list held in the memory 152. The address list in the memory 152 is updated based on the comparison list.

Figure 13:
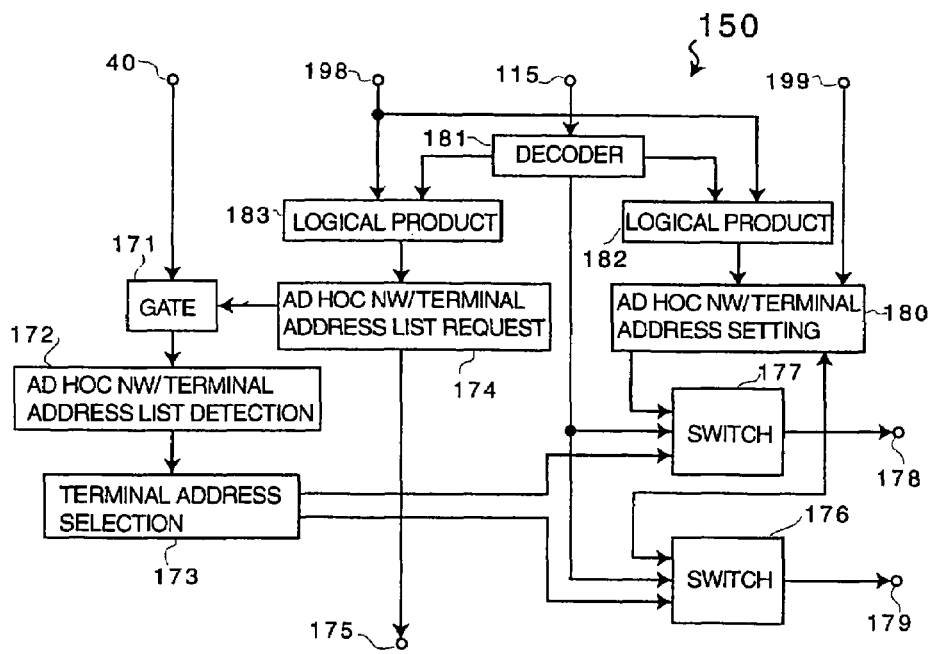
FIG. 13 is a block diagram illustrating the configuration of the ad hoc NW/terminal address capture means in FIG. 12.

The ad hoc network/terminal address capture means 150 shown in FIG. 12 can be configured as shown in FIG. 13. Referring to FIG. 13, numerals 115, (198), (199) and 40 represent input terminals; 175, 178 and 179 represent output terminals; 183 and 182 represent logical product circuits; 171 represents a gate; 181 represents a decoder; 180 represents ad hoc network/terminal address setting means; 174 represents ad hoc network/terminal address list request message transmission means; 172 represents ad hoc network/terminal address list message detection means; 173 represents ad hoc network/terminal address selection means; and 177 and 178 represent switches. A signal is input from the output terminal 24 via the input terminal 115. The decoder 181 outputs a start-up pulse to the logical product circuit 182 when a new ad hoc network is configured and outputs a start-up pulse to the logical product circuit 183 when the mobile terminal is connected to the existing ad hoc network. The logical product circuit 183 obtains the logical product of the network address captured signal input via the input terminal 170 and the output of the decoder 181. The logical product circuit 182 obtains the logical product of the network address captured signal input via the input terminal 170 and the output of the decoder 181. When both the signal from the decoder 181 and the signal from the input terminal 198 are input, the logical product circuit 183 starts up the ad hoc network/terminal address list request message transmission means 174 to connect the mobile terminal to the existing ad hoc network. When both the signal from the decoder 181 and the signal from the input terminal 198 are input, the logical product circuit 182 starts up the ad hoc network/terminal address setting means 180. Moreover, by controlling the switches 176 and 177, the decoder 181 outputs the output from the ad hoc network/terminal address selection means 173 when the mobile terminal is connected to the existing ad hoc network and outputs the output from the ad hoc network/terminal address setting means 180 when a new ad hoc network is configured.

First, the ad hoc network/terminal address setting means 180 is started up and then captures the terminal address in the new ad hoc network. The ad hoc network/terminal address setting means 180 receives a network address to be used in the new ad hoc network, from the output terminal 134 via the input terminal 199. Since there are no other terminals in the ad hoc network, the ad hoc network/terminal address setting means 180 decides a terminal address based on the network address from the input terminal 199. Moreover, an address list is output based on a predetermined address. The switch 176 outputs the address list to the memory 152 via the output terminal 179. When the address list is output, the switch 177 outputs a terminal address capture signal showing terminal address capture to the control circuit 151 via the output terminal 178.

When the mobile terminal is connected to the existing ad hoc network, the ad hoc network/terminal address list request message transmission means 174 is started up. The ad hoc network/terminal address list request message transmission means 174 creates an ad hoc network/terminal address list request message requiring a terminal address list connected to the ad hoc network and then outputs it as a broadcast packet on the communication medium via the output terminal 175, thus transmitting it to the transmission queue 160. At this time, the gate 171 passes a receive packet input from the input terminal 170. The ad hoc network/ terminal address list message detection means 172 receives a receive packet from the input terminal 40 and then detects an ad hoc network/terminal address list message containing as a message an address list. The ad hoc network/terminal address list message detection means 172 extracts an address list from the message and outputs it to the ad hoc network/ terminal address list selection means 173. The ad hoc network/terminal address list selection means 173 selects an address not still used from the input address list as the terminal address of the mobile terminal, enters it into the address list, and then outputs it to the memory 152 via the switch 176 and the output terminal 179. The terminal address capture signal showing the terminal address capture is output to the control circuit 151 via the switch 177 and the output terminal 178.

Figure 14:
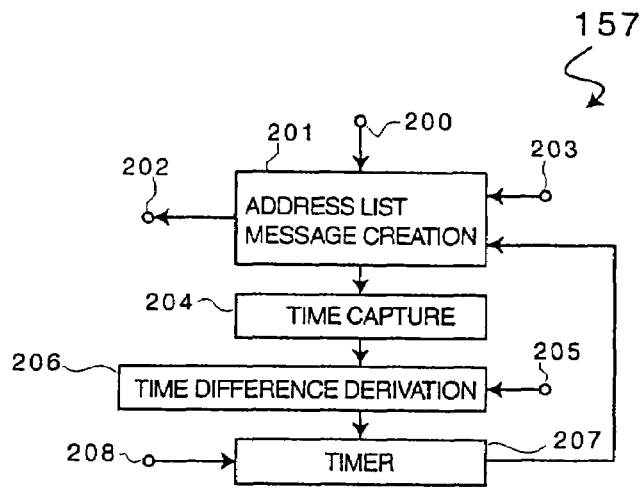
FIG. 14 is a block diagram illustrating the configuration of the ad hoc NW/terminal address list transmission means in FIG. 12.
Figure 15:
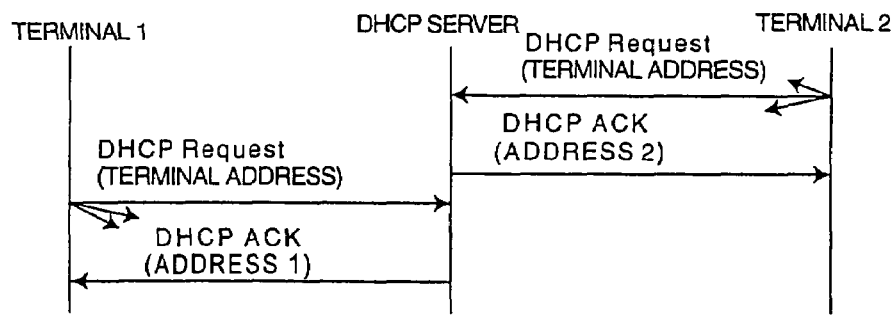
FIG. 15 is a diagram illustrating the address capture procedure in a conventional infrastructure network.
Figure 16:
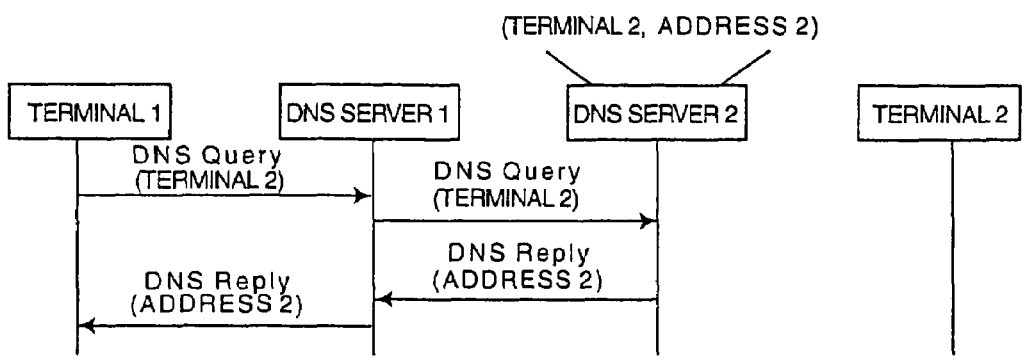
FIG. 16 is a diagram illustrating the destination terminal address capture procedure in a conventional infrastructure network.

The ad hoc network/terminal address list transmission means 157 shown in FIG. 12 can be configured as shown in FIG. 14. The ad hoc network/terminal address list transmission means 157 employs the mobile terminal control method (procedure of providing information) according to the third aspect of the present invention. Referring to FIG. 14, numerals 200, 203, 205 and 208 represents input terminals; 202 represents an output terminal; 201 represents ad hoc network/terminal address list message creation means; 204 represents current time capture means; 206 represents time difference derivation means; and 207 represents a timer. In response to the start-up signal from the ad hoc network/ terminal address request detection means 155 via the input terminal 200, the ad hoc network/terminal address list message creation means 201 receives an address stored in the memory 152 from the input terminal 203 and then creates an ad hoc network/terminal address list message, thus starting up the current time capture means 204. The current time capture means 204 captures a current time and outputs it to the time difference deviation means 206. The time difference deviation means 206 receives the current time and a terminal address capture time stored in the memory 153 via the input terminal 205 and derives the time for which the terminal is connected to the ad hoc network, thus outputting it to the timer 207. The timer 207 determines the measurement time based on the connection time derived from the time difference deviation means 206. The timer 207 receives a process halt signal output from the ad hoc network/terminal address list detection means 156 via the input terminal 208. In response to the process halt signal, the timer 207 is reset. The timer 207 notifies the ad hoc network/terminal address list message creation means 201 of its time-out. When receiving notification of the time-out from the timer 207, the ad hoc network/terminal address list message creation means 201 outputs a created ad hoc network/terminal address list message to the transmission queue 160 via the output terminal 202 to transmit as a broadcast packet onto the communication medium.

According to the present invention, the mobile terminal can integrally move between an infrastructure network and an ad hoc network.

Moreover, according to the present invention, the mobile terminal control method (method of providing information) can effectively provide necessary information for communications.

The entire disclosure of Japanese Patent Application No. 9-210995 filed on Aug. 5, 1997 including specification, claims, drawing and summary are incorporated herein by reference in its entirety.

What is claimed is:

1. A mobile terminal connectable in a mobile mode between an infrastructure network and an ad hoc network, said infrastructure network being a permanent network interconnected via a relay node, said ad hoc network being a temporary network formed of only plural mobile terminals, said infrastructure network having plural mobile terminals, relay nodes, and a server which provides information needed for connection of mobile terminals, wherein an infrastructure network connection procedure and an ad hoc network connection procedure are configured in an integrated mode in an address management process, a connection network identification process and a destination address capture process which are needed when said mobile terminal is connected to a network to establish communications, wherein each process includes identifying whether a network to which said mobile terminal is connected is the ad hoc network or the infrastructure network and then using a procedure corresponding to the connected network, and a first counter configured to perform a reset operation by receiving an ad hoc network advertisement message receive signal and a reset signal, to count, as a first count when said reset signal is input, a number of ad hoc network advertisement messages, and to output the first count;

a second counter configured to perform a reset operation by receiving an infrastructure network advertisement message receive signal and a reset signal, to count, as a second count when said reset signal is input, a number of infrastructure network advertisement messages, and to output the second count;

a timer configured to measure a predetermined period of time and to output said reset signal when a time-out occurs;

a first comparator configured to compare the first count with zero, and to output a comparison result as said infrastructure network connection signal to a decoder; and a second comparator configured to compare the second count with zero, and to output the comparison result as said ad hoc network connection signal to said decoder, said decoder being configured to determine whether said mobile terminal has moved between the infrastructure network and the ad hoc network based on the received infrastructure connection signal and the received ad hoc network connection signal.

2. A mobile terminal connectable in a mobile mode between an infrastructure network and an ad hoc network, said infrastructure network being a permanent network interconnected via a relay node, said ad hoc network being a temporary network formed of a plurality of mobile networked terminals, said infrastructure network having a plurality of mobile terminals, relay nodes, and a server which provides information needed for connection of mobile terminals, said mobile terminal comprising:

receive packet input means for inputting as a receive packet a packet transmitted onto a communication medium configuring a network to be connected;

transmission packet output means for transmitting a transmission packet onto said communication medium;

means for inputting an opposite communication party's name to said mobile terminal;

means for outputting a destination address corresponding to said opposite communication party's name;

address management means for receiving said receive packet, for identifying whether said network to be connected is said infrastructure network or said ad hoc network, and for transmitting said transmission packet which captures and manages an address used in said network;

destination address capture means for receiving said receive packet, for identifying whether network to be connected is said infrastructure network or said ad hoc network, for outputting said transmission packet to capture said destination address corresponding to said opposite communication party's name, and for obtaining a destination address of said opposite communication party's name;

move management means for receiving said receive packet and outputting said transmission packet to manage whether or not said movable terminal has moved from said network to be connected to another network;

a first counter configured to perform a reset operation when said reset signal is input by receiving an ad hoc network advertisement message receive signal and a reset signal to count, as a first count, a number of ad hoc network advertisement messages, and to output the first count;

a second counter configured to perform a reset operation by receiving an infrastructure network advertisement message receive signal and a reset signal, to count, as a second count a number of infrastructure network advertisement messages, and to output the second count when said reset signal is input;

a timer configured to measure a predetermined period of time and to output said reset signal when a time-out occurs;

a first comparator configured to compare the first count with zero, and to output a comparison result as said infrastructure network connection signal to a decoder; and a second comparator configured to compare the second count with zero, and to output the comparison result as said ad hoc network connection signal to said decoder, said decoder being configured to determine whether said mobile terminal has moved between the infrastructure network and the ad hoc network based on the received infrastructure connection signal and the received ad hoc network connection signal.

3. The mobile terminal defined in claim 2, wherein said address management means comprises:

a. ad hoc/infrastructure network identification means for identifying whether or not a network to be connected by said mobile terminal itself is said infrastructure network or said ad hoc network in response to said receive packet, for outputting a network identification signal representing a network to which a network to be connected by said mobile terminal itself is connected, for outputting an infrastructure network connection signal when said network to be connected is said infrastructure network, and for outputting an ad hoc network connection signal when said network to be connected is said ad hoc network;

b. infrastructure network address management means for receiving said receive packet and said infrastructure network connection signal, for outputting necessary transmission data as said transmission packet, and for managing an address used by said mobile terminal itself when a network to be connected by said mobile terminal itself is an infrastructure network;

c. ad hoc network address management means for receiving said receive packet and said ad hoc network connection signal, for outputting necessary data as said transmission packet, and for managing an address used by said mobile terminal itself when said network to be connected by said mobile terminal itself is an ad hoc network; and d. a switch for receiving said network identification signal, said transmission packet from said infrastructure network address management means, and said transmission packet from said ad hoc network address management means, for selectively outputting said transmission packet from said infrastructure network address management means by said network identification signal when a network in a connection state to said mobile terminal itself is an infrastructure network, and for selectively outputting said transmission packet from said ad hoc network address management means when said network in a connection state is an ad hoc network.

4. The mobile terminal defined in claim 3, wherein said ad hoc/infrastructure network identification means comprises:

infrastructure network advertisement message receive means for Receiving an infrastructure network advertisement message containing a network address of an infrastructure in response to said receive packet and for outputting an infrastructure network advertisement message receive signal representing that said infrastructure network advertisement message has been received when said infrastructure network advertisement message contains a network address equal to a network address of a network connected to said mobile terminal;

ad hoc network advertisement message receive means for receiving an ad hoc network advertisement message containing a network address of an ad hoc network in response to said receive packet and for outputting an ad hoc network advertisement message receive signal representing that said ad hoc network advertisement message has been received when said ad hoc network advertisement message contains a network address equal to a network address of a network connected to said mobile terminal;

an adder for adding an output from said first counter and an output from said second counter; and a third comparator for comparing the output from said adder with zero to obtain a result and outputting said result to said decoder which creates said network identification signal and to an encoder which creates said ad hoc network connection signal;

said decoder receiving signals from said first, said second, and said third comparators to create an infrastructure or ad hoc network connection signal;

said encoder receiving signals from said second and said third comparators-and then encoding said ad hoc network connection signal representing whether or not said mobile terminal configures a new ad hoc network or said mobile terminal itself is connected to an existing ad hoc network, based on said input signal.

5. The mobile terminal defined in claim 3, wherein said ad hoc network address management means comprises:

a. ad hoc network/network address management means for receiving said receive packet and said ad hoc network connection signal, outputting a message requesting a network address containing a network address used in a new ad hoc network when a new ad hoc network is configured for connection as said transmission packet and a message representing a spent network address when said ad hoc network/network address request message containing said spent network address in an ad hoc network connected by said mobile terminal itself has been received, capturing a network address of an ad hoc network to which said mobile terminal itself is connected, based on said receive packet, outputting a network address captured signal representing that the captured network address and the network address have been captured, and managing said captured network address not to be used in an overlap mode; and b. an hoc network/terminal address management means for receiving said receive packet, said ad hoc network connection signal, said captured network address, and said network address captured signal, outputting as said transmission packet a message requesting a terminal address list being used in said ad hoc network when said mobile terminal is connected to an existing ad hoc network and a message containing said terminal address list held by said mobile terminal itself in response to said address list requesting message, capturing a terminal address used in ad hoc network to be connected by said mobile terminal itself, based on said receive packet and said ad hoc network connection signal, and acknowledging a terminal address to be used in said ad hoc network connected by said mobile terminal itself.

6. The mobile terminal defined in claim 2, wherein said destination address capture means comprises:

a. ad hoc/infrastructure network identification means for receiving said receive packet, identifying whether or not a network to which said mobile terminal is connected is said infrastructure network or said ad hoc network, outputting a network identification signal representing a network to be connected to a network connected by said mobile terminal, outputting an infrastructure network connection signal when said network to be connected is said infrastructure network, and outputting an ad hoc network connection signal when said network to be connected is said ad hoc network;

b. a first switch for receiving the name of said opposite communication party's name of said mobile terminal itself and said network identification signal and selecting a destination of said opposite communication party's name based on said network identification signal;

c. infrastructure network/destination address capture means for receiving said infrastructure network connection signal and said opposite communication party's name, transmitting a message requesting a terminal address corresponding to said communication opponent's name, detecting a message containing a terminal address corresponding to said opposite communication party's name from said receive packet, and outputting said terminal address corresponding to said opposite communication party's name;

d. ad hoc network/destination address capture means for receiving said ad hoc network connection signal and said opposite communication party's name, transmitting a message requesting a terminal address corresponding to said opposite communication party's name, detecting a message containing a terminal address corresponding to said opposite communication party's name from said receive packet, and outputting said terminal address corresponding to said opposite communication party's name;

e. a second switch for selectively outputting a terminal address corresponding to said opposite communication party's name captured by said infrastructure network destination address capture means and a terminal address corresponding to said opposite communication party's name captured by said ad hoc network/destination address capture means, based on said network identification signal; and f. a third switch for selectively transmitting a message requesting a terminal address corresponding to said opposite communication party's name captured by said infrastructure network/destination address capture means and a message requesting a terminal address corresponding to said opposite communication party's name captured by said ad hoc/destination address capture means, based on said network identification signal.

7. The mobile terminal defined in claim 6, wherein said ad hoc network/destination address capture means comprises:

a. destination terminal address detection means for receiving said network identification signal, starting up when a connection network of said mobile terminal itself is an ad hoc network, receiving said receive packet and said opposite communication party's name, outputting the terminal address of said opposite communication party's name by detecting a destination address message containing correspondence relationships between said opposite communication party's name and said opposite communication party's terminal address from said receive packet, and outputting a terminal address capture signal of said opposite communication party;

b. destination terminal address request message output means for receiving said opposite communication party's name, broadcasting as said transmission packet a message requesting the correspondence relationship between said opposite communication party's name and said opposite communication party's terminal to a communication medium in which a connection network of said mobile terminal itself configures an ad hoc network, and outputting a timer start-up signal;

c. a timer for starting measuring a predetermined period of time in response to said timer start-up signal, ceasing measurement of said predetermined period of time when a terminal address capture signal of said opposite communication party is received during measuring said predetermined period of time, and outputting a time-out signal representing a timeout when the measurement of said predetermined period of time ends;

d. terminal address non-capture detection means for outputting a terminal address non-capture signal representing that a terminal address corresponding to said opposite communication party's name cannot be captured, when said time-out signal is received;

e. a control circuit for outputting a switch control pulse that selects said terminal address non-capture signal when said time-out signal is input and selects a terminal address capture signal of said opposite communication party when a terminal address capture signal of said opposite communication party is input;

f. a switch for selectively outputting said terminal address non-capture signal or said terminal address capture signal of said opposite communication party, based on said switch control pulse;

g. destination terminal address request message detection means for detecting said destination terminal address request message in response to said receive packet and then outputting said destination address message transmission request signal when said destination terminal address request message requests a terminal address to the name of said mobile terminal itself; and h. destination terminal address message transmission means for broadcasting as said transmission packet said destination terminal address message containing its own terminal address to a communication medium in which a connection network of said mobile terminal configures an ad hoc network, when said destination address message transmission request signal is input.

8. The mobile terminal defined in claim 6, wherein said ad hoc/infrastructure network identification means comprises:

infrastructure network advertisement message receive means for receiving an infrastructure network advertisement message containing a network address of an infrastructure network in response to said receive packet, and outputting an infrastructure network advertisement message receive signal representing that said infrastructure network advertisement message has been received when said infrastructure network advertisement message contains a network address equal to a network address of a network connected by said mobile terminal;

ad hoc network advertisement receive means for receiving an ad hoc network advertisement message containing a network address of an ad hoc network in response to said receive packet, and outputting an ad hoc network advertisement message receive signal representing that said ad hoc network advertisement message has been received when said ad hoc network advertisement message contains a network address equal to a network address of a network connected by said mobile terminal.

9. The mobile terminal defined in claim 2, wherein said mobile management means comprises:

a. network advertisement request message transmission means for detecting said infrastructure network advertisement message or said ad hoc network advertisement message containing a network address of a network to which said mobile terminal is connected, in response to said receive packet, detecting that said mobile terminal has been moved to a different network when said infrastructure network advertisement message or said ad hoc network advertisement message cannot be received for a predetermined period of time, and transmitting said infrastructure network advertisement message or said ad hoc network advertisement request message requesting the network address of said network; and b. ad hoc network advertisement means for receiving said receive packet when a network to which said mobile terminal is connected is an ad hoc network, and transmitting said ad hoc network advertisement message representing the presence of said ad hoc-network in cooperation with another mobile terminal connected to said ad hoc network.

10. The mobile terminal defined in claim 9, wherein said network advertisement request message transmission means comprises:

infrastructure-network advertisement message receive means for receiving an infrastructure network advertisement message containing a network address of an infrastructure network in response to said receive packet, and outputting an infrastructure network advertisement message receive signal representing that said infrastructure network advertisement message has been received when said infrastructure network advertisement message contains a network address equal to the network address of a network to which said mobile terminal is connected;

ad hoc network advertisement message receiving means for receiving an ad hoc network advertisement message containing a network address of an ad hoc network in response to said receive packet, and for outputting an ad hoc network advertisement message receive signal representing that said ad hoc network advertisement message has been received when said ad hoc network advertisement message contains a network address equal to a network address of a network to which said mobile terminal is connected;

an adder for adding an output from said first counter and an output from said second counter;

a comparator for comparing the output from said adder with zero to obtain a result, and outputting an advertisement message non-receive signal when said result equals zero;

infrastructure network advertisement request message transmission means for broadcasting said infrastructure network advertisement request message onto a communication medium used by said mobile terminal itself when said advertisement message non-receive signal is received; and ad hoc network advertisement request message transmission means for broadcasting said ad hoc network advertisement request message onto the communication medium used by said mobile terminal itself when said advertisement message non-receive signal is received.

11. A mobile terminal configured to be connected in a mobile mode between an infrastructure network and an ad hoc network, said infrastructure network being a permanent network interconnected via a relay node, said ad hoc network being a temporary network formed of a plurality of terminals, said infrastructure network having a plurality of mobile terminals, relay nodes, and a server which provides information needed for connection of mobile terminals, said mobile terminal comprising:

a transmitter for transmitting a message for requesting information to the mobile terminal to be connected to said ad hoc network; and a receiver for receiving information, which is transmitted responding to the message for requesting said information, from a terminal of the plurality of terminals of which a connection time to said ad hoc network is shortest, wherein the mobile terminal is configured to count, as a first count, ad hoc network advertisement messages, and to count, as a second count, infrastructure network advertisement messages, and to detect whether the mobile terminal is moved from at least one of the ad hoc network and infrastructure network based on the first count and the second count.

* * * * *